United States Patent
Rezai et al.

(10) Patent No.: US 9,352,306 B2
(45) Date of Patent: May 31, 2016

(54) CATALYST AND PROCESS FOR REMOVING OXYGEN FROM HYDROCARBON STREAMS

(71) Applicant: BASF SE, Ludwigshafen (DE)

(72) Inventors: Alireza Rezai, Mannheim (DE); Gauthier Luc Maurice Averlant, Frankfurt (DE); Petr Kubanek, Mannheim (DE); Martin Dieterle, Ludwigsshafen (DE); Thomas Heidemann, Viernheim (DE)

(73) Assignee: BASF SE (DE)

( * ) Notice: Subject to any disclaimer, the term of this patent is extended or adjusted under 35 U.S.C. 154(b) by 262 days.

(21) Appl. No.: 13/932,061

(22) Filed: Jul. 1, 2013

(65) Prior Publication Data
US 2014/0012060 A1    Jan. 9, 2014

Related U.S. Application Data

(60) Provisional application No. 61/667,437, filed on Jul. 3, 2012.

(51) Int. Cl.
| C07C 7/10 | (2006.01) |
| B01J 21/00 | (2006.01) |
| B01J 29/00 | (2006.01) |
| B01J 29/04 | (2006.01) |
| B01J 23/00 | (2006.01) |
| B01J 23/40 | (2006.01) |
| B01J 23/42 | (2006.01) |
| B01J 23/44 | (2006.01) |
| B01J 29/74 | (2006.01) |
| B01J 35/10 | (2006.01) |

(52) U.S. Cl.
CPC .......... B01J 29/7407 (2013.01); B01J 35/1014 (2013.01); B01J 2229/186 (2013.01)

(58) Field of Classification Search
CPC ............ B01J 23/14; B01J 23/42; B01J 23/56; B01J 23/62; B01J 29/068; B01J 29/7053; B01J 29/7407; C07C 7/00; C07C 7/08
USPC ............... 502/74, 87, 326, 339, 352; 585/833
See application file for complete search history.

(56) References Cited

U.S. PATENT DOCUMENTS

| 3,894,110 A * | 7/1975 | Drehman | C07C 5/325 502/240 |
| 3,957,688 A * | 5/1976 | Farha, Jr. | B01J 23/66 502/242 |
| 4,169,815 A * | 10/1979 | Drehman | B01J 23/005 502/259 |
| 4,191,846 A * | 3/1980 | Farha, Jr. | B01J 23/8966 585/435 |
| 5,278,113 A * | 1/1994 | Ono | B01D 53/86 502/66 |
| 5,702,838 A * | 12/1997 | Yasumoto | B01J 29/7407 429/412 |
| 6,548,447 B1 * | 4/2003 | Yokoyama | B01J 23/626 502/331 |
| 6,726,890 B1 * | 4/2004 | Watanabe | B01J 29/20 423/246 |
| 6,846,773 B1 * | 1/2005 | Yokoyama | B01J 23/626 502/332 |
| 7,247,593 B2 * | 7/2007 | Juttu | B01J 29/04 502/66 |
| 8,323,601 B2 * | 12/2012 | Justice | B01D 53/944 423/213.5 |
| 2005/0032628 A1 * | 2/2005 | Collier | B01J 23/40 502/66 |
| 2007/0004926 A1 | 1/2007 | Schindler et al. | |
| 2007/0244349 A1 | 10/2007 | Crone et al. | |
| 2008/0097133 A1 | 4/2008 | Crone et al. | |
| 2008/0119680 A1 | 5/2008 | Crone et al. | |
| 2008/0183024 A1 | 7/2008 | Klanner et al. | |

FOREIGN PATENT DOCUMENTS

| WO | WO-2004/033598 A1 | 4/2004 |
| WO | WO-2006050969 A1 | 5/2006 |
| WO | WO-2006061202 A1 | 6/2006 |
| WO | WO-2006066848 A1 | 6/2006 |
| WO | WO-2006075025 A1 | 7/2006 |
| WO | WO-2010130610 A1 | 11/2010 |

OTHER PUBLICATIONS

U.S. Appl. No. 13/411,080, filed Mar. 2, 2012, Kostova et al.
U.S. Appl. No. 13/723,544, filed Dec. 21, 2012, Patcas et al.
International Search Report for PCT/EP2013/063887, dated Sep. 10, 2013.
Yang, H., et al., "Incorporating platinum precursors into a NaA-zeolite synthesis mixture promoting the formation of nanosized zeolite", Microporous and Mesoporous Materials, vol. 117, (2009), pp. 33-40.

* cited by examiner

*Primary Examiner* — Cam N. Nguyen
(74) *Attorney, Agent, or Firm* — Drinker Biddle & Reath LLP

(57) ABSTRACT

The catalyst comprises from 0.01 to 0.5% by weight of platinum, based on the catalyst, and optionally tin, with the weight ratio of Sn:Pt being from 0 to 10, on zeolite A as support.

14 Claims, No Drawings

CATALYST AND PROCESS FOR REMOVING OXYGEN FROM HYDROCARBON STREAMS

CROSS-REFERENCE TO RELATED APPLICATIONS

This application claims the benefit of U.S. Provisional Application 61/667,437, filed Jul. 3, 2012, which is incorporated herein by reference.

The invention relates to a catalyst and process for removing oxygen from hydrocarbon streams comprising free oxygen, and also the corresponding use of the catalyst.

Hydrocarbon streams which comprise free oxygen and from which the free oxygen should or must be removed can be obtained in various chemical processes.

For example, in a gas stream comprising ethylenically unsaturated hydrocarbons, free oxygen can lead to formation of peroxides which are difficult to handle from a safety point of view.

WO 2006/075025 describes a process for preparing butadiene from n-butane by nonoxidative, catalytic dehydrogenation of n-butane, subsequent oxidative dehydrogenation and workup of the product mixture. After the oxidative dehydrogenation, the oxygen remaining in the product gas stream can be removed, for example by reacting it catalytically with hydrogen. A corresponding $C_4$ product gas stream can comprise from 20 to 80% by volume of butadiene, from 20 to 80% by volume of n-butane, from 5 to 50% by volume of 2-butene and from 0 to 20% by volume of 1-butene and also small amounts of oxygen. The residual oxygen can cause problems since it can act as initiator for polymerization reactions in downstream process steps. This risk is particularly great when butadiene is separated off by distillation and can there lead to deposition of polymers (formation of "popcorn") in the extractive distillation column. A removal of oxygen is therefore carried out immediately after the oxidative dehydrogenation, generally by means of a catalytic combustion step in which oxygen is reacted with the hydrogen comprised in the gas stream in the presence of a catalyst. Here, a reduction in the oxygen content down to small traces is achieved. α-Aluminum oxide comprising from 0.01 to 0.1% by weight of platinum and from 0.01 to 0.1% by weight of tin is described as suitable catalyst. As an alternative, catalysts comprising copper in reduced form are also reported.

WO 2010/130610 describes a process for preparing propylene oxide by reaction of propene with hydrogen peroxide and isolation of the propylene oxide to give a gas mixture comprising propylene and oxygen. Hydrogen is added to this gas mixture and the oxygen comprised is at least partly reacted by reaction with the hydrogen in the presence of a copper-comprising catalyst. Here, the catalyst comprises from 30 to 80% by weight of copper, calculated as CuO.

Apart from "popcorn" formation, the oxygen content in hydrocarbon-comprising gas mixtures, in particular gas mixtures comprising butadiene and oxygen, can contribute to deactivation of catalysts, to soot deposits, peroxide formation, to a deterioration in the adsorption properties of solvents in the work-up process.

Particularly in the preparation of butadiene from n-butane, selective oxygen removal is a basic prerequisite for carrying out the process economically since every loss of the target product butadiene is associated with increased costs. The specification to be met is a residual oxygen concentration after the oxygen removal step of less than 100 ppm.

It is an object of the present invention to provide improved catalysts for catalytic oxygen removal from hydrocarbon mixtures. The catalyst should allow the selective reaction of free oxygen with free hydrogen to be catalyzed when there is a content of free hydrogen in the hydrocarbon stream without appreciable amounts of hydrocarbons, in particular butadiene, also being reacted. Even in the absence of free hydrogen, the content of free oxygen should be reduced.

The object is achieved according to the invention by a catalyst comprising from 0.01 to 0.5% by weight of platinum, based on the catalyst, and optionally tin, with the weight ratio of Sn:Pt being from 0 to 10, on zeolite A as support.

The object is additionally achieved according to the invention by use of the catalyst for removing oxygen from a hydrocarbon stream comprising free oxygen by catalytic combustion in the presence or absence of free hydrogen.

The object is additionally achieved by a process for removing oxygen from a hydrocarbon stream comprising free oxygen by catalytic combustion, in which the hydrocarbon stream comprising free oxygen is reacted over a catalyst as described above to give an oxygen-depleted hydrocarbon stream.

The catalyst used according to the invention has the advantage that it catalyzes particularly the reaction of hydrogen with oxygen without an appreciable reaction of hydrocarbon with the free oxygen occurring. In the case of the preparation of butadiene from butene or n-butane, reaction of the butadiene with the free oxygen preferably does not occur.

A further advantage of the use of the catalyst of the invention is its stability to water in the feed, in particular at from 5 to 30% of water in the feed.

The catalyst of the invention comprises zeolite A as support. Preference is given to at least 80% by weight, particularly preferably at least 90% by weight, in particular at least 95% by weight, based on the support, of zeolite A being present in the support. In particular, the support is made up entirely of zeolite A.

Zeolite A is a synthetic, crystalline aluminosilicate and in its hydrated sodium form has the empirical formula $Na_{12}((AlO_2)_{12}(SiO_2)_{12}) \times 27\ H_2O$. The designation "zeolite A" comprises a number of variants of this compound which all have the same aluminosilicate lattice. Instead of sodium ions, they may however comprise other ions such as potassium or calcium. Low-water or water-free forms are, according to the invention, also counted as zeolite A. Other names are molecular sieve A, LTA (Linde type A), MS 5 A (with Ca), MS 4 A (with Na), NF3 A (with K), Sasil®.

Zeolite A has a framework structure composed of $AlO_4$ and $SiO_4$ tetrahedra. They form a covalent lattice with voids which generally comprise water. $AlO_4$ and $SiO_4$ tetrahedra are present in a ratio of 1:1. Here, aluminum and silicon atoms are alternately bound to one another via oxygen atoms. This gives an overall negative charge which is balanced by ionic compounds having cations such as sodium ions. As three-dimensional structure, zeolite A has a sodalite cage.

The catalyst of the invention comprises from 0.01 to 0.5% by weight, preferably from 0.05 to 0.4% by weight, in particular from 0.1 to 0.3% by weight, of platinum, based on the catalyst. It can additionally comprise tin, with the weight ratio of Sn:Pt being from 0 to 10, preferably from 0 to 7, particularly preferably from 0 to 3. When tin is concomitantly used, the weight ratio of Sn:Pt is preferably from 0.5 to 10, particularly preferably from 0.7 to 4, in particular from 0.9 to 1.1. A special preference is given to a weight ratio of Sn:Pt of 1:1.

The catalyst of the invention can comprise further metals, for example alkali metal compounds and/or alkaline earth metal compounds, preferably in amounts of <2% by weight, in particular <0.5% by weight, based on the catalyst, in addition to platinum and tin. Particular preference is given to the catalyst comprising exclusively platinum and optionally tin as active metals.

In the finished catalyst, the BET surface area is preferably from 10 to 80 m$^2$/g, particularly preferably from 15 to 50 m$^2$/g, in particular from 20 to 40 m$^2$/g.

The catalyst can be used in any suitable form. It is preferably used as a shaped body having an average diameter in the range from 1 to 10 mm, particularly preferably from 2 to 8 mm, in particular from 2.5 to 5 mm. The shaped body can have any suitable shape; it can be present as extrudate, pellet, granules, crushed material or preferably in spherical form having the average diameter indicated. Further possible shaped bodies are annular pellets, cylinders, star extrudates or extrudates in the form of a toothed wheel.

As an alternative, the catalyst can be present as a monolith, with the monolith being able to bear the catalyst as washcoat on a support structure. This support structure can predetermine the three-dimensional structure of the monolith. For example, the support structure can be made up of cordierite.

The proportion of the washcoat in the total monolith is preferably from 0.5 to 5 g/inch$^3$.

The catalyst of the invention can be produced by any suitable processes. It is preferably produced by impregnation of the support with a solution of a platinum compound and optionally a tin compound and subsequent drying and calcination. For example, platinum nitrate can be used as aqueous solution for impregnating the support. Impregnation can be followed by drying, preferably at from 80 to 150° C., and a calcination, preferably at from 200 to 500° C. Drying is preferably carried out for a period in the range from 1 to 100 hours, particularly preferably from 5 to 20 hours. Calcination is preferably carried out for a period of from 1 to 20 hours, particularly preferably from 2 to 10 hours.

The actual production of the catalyst can be followed by silylation, for example by use of an aqueous colloidal dispersion of very small silicon dioxide particles as are available, for example, under the trade name Ludos® from Helm AG. This silylation can also be affected by impregnation with subsequent drying and calcination, as described above.

The catalyst of the invention displays, in particular, a long-term stability, especially in the dehydrogenation of butane or butene to produce butadiene, where free oxygen is to be separated off from the butadiene-comprising product stream.

The catalytic removal of oxygen can in principle be carried out in all reactor types and modes of operation known from the prior art, for example in a fluidized bed, tray oven, in a fixed-bed tube reactor or shell-and-tube reactor or in a plate heat exchanger reactor. The removal of oxygen according to the invention can be carried out in a separate reaction step, but can also be combined with oxidative dehydrogenation in a reactor, with two catalysts being present in one reactor.

The process of the invention can be used for removing oxygen from any hydrocarbon streams. It is preferably used for removing oxygen from hydrocarbon streams comprising $C_{2-6}$-hydrocarbons, preferably $C_3$- or $C_4$-hydrocarbons. The process is particularly preferably applied to butadiene- or propene-comprising hydrocarbon streams.

A special preference is given to at least 80% by volume, particularly preferably at least 90% by volume, of the hydrocarbons in the hydrocarbon stream being $C_3$- and/or $C_4$-hydrocarbons.

Particular preference is given to using a butadiene-comprising hydrocarbon stream which originates from the preparation of butadiene from n-butane or n-butenes. In general, a nonoxidative catalytic n-butane dehydrogenation is firstly carried out, followed by an oxidative dehydrogenation. Suitable processes are described, for example, in WO 2006/075025, WO 2006/050969, WO 2006/061202 or WO 2006/066848.

For example, the preparation of butadiene from n-butane is carried out by introduction of an n-butane-comprising feed gas stream into at least one first dehydrogenation zone and nonoxidative catalytic dehydrogenation of the n-butane, giving a product gas stream comprising n-butane, 1-butene, 2-butene, butadiene, hydrogen, low-boiling secondary constituents, possibly carbon oxides and possibly water vapor. This product gas stream is fed together with an oxygen-comprising gas into at least one further dehydrogenation zone for oxidative dehydrogenation, giving a product gas stream comprising n-butane, 2-butenes, butadienes, low-boiling secondary constituents, carbon oxides and water vapor.

The product gas stream leaving the oxidative dehydrogenation comprises butadiene and n-butane which has not previously been separated off together with hydrogen, carbon oxides and water vapor, It can further comprise, as secondary constituents, oxygen, inert gas such as nitrogen, methane, ethane, ethene, propane and propene and also oxygen-comprising hydrocarbons, known as oxygenates.

In general, the product gas stream leaving the oxidative dehydrogenation comprises from 2 to 40% by volume of butadiene, from 5 to 80% by volume of n-butane, from 0 to 15% by volume of 2-butenes, from 0 to 5% by volume of 1-butene, from 5 to 70% by volume of water vapor, from 0 to 10% by volume of low-boiling hydrocarbons (methane, ethane, ethene, propane and propene), from 0.1 to 15% by volume of hydrogen, from 0 to 70% by volume of inert gas, from 0 to 10% by volume of carbon oxides, from 2 to 10% by volume of oxygen and from 0 to 10% by volume of oxygenates, where the total amount of the constituents is 100% by volume. Oxygenates can be, for example, acetic acid, methacrolein, maleic anhydride, maleic acid, phthalic anhydride, propionic acid, acetaldehyde, acrolein, formaldehyde, formic acid, benzaldehyde, benzoic acid and butyraldehyde. Acetylene, propyne and 1,2-butadiene can additionally be comprised in traces.

The removal of oxygen according to the invention is preferably carried out directly after the oxidative dehydrogenation.

The hydrocarbon stream used preferably comprises from 3 to 8% by weight, particularly preferably from 3 to 6% by weight, of free oxygen.

The hydrocarbon stream comprising free oxygen can comprise an amount of free hydrogen which is sufficient for reaction with the free oxygen. Missing amounts or the total amount of the free hydrogen required can be added to the hydrocarbon stream. In this way of carrying out the reaction, the free oxygen can be reacted with the free hydrogen, so that no appreciable proportion of the hydrocarbon is reacted with the oxygen.

In an alternative embodiment, the hydrocarbon stream comprising free oxygen does not comprise any free hydrogen and no free hydrogen is added thereto either. In this case, the free oxygen can be reacted with the hydrocarbon comprised in the hydrocarbon stream comprising free oxygen or with added methanol, natural gas and/or synthesis gas as reducing agent.

The process can be carried out isothermally or adiabatically. An advantage of the reaction of hydrogen is the formation of water as reaction product. The water formed can easily be separated off by condensation.

In addition, a low reaction pressure can be advantageous since this makes it possible to avoid a separate compression step after the oxidative dehydrogenation. A relatively low reaction pressure allows less expensive reactor construction and is advantageous from a safety point of view.

The process of the invention is therefore preferably carried out at a pressure of from 0.5 to 3.0 bar (absolute), particularly preferably from 1.0 to 2.0 bar (absolute).

The reaction is preferably carried out at a temperature in the range from 120 to 500° C., particularly preferably from 250 to 400° C.

The type of reactor is not subject to any restrictions according to the invention. For example, the reaction can be carried out in a fluidized bed, in a tray oven, in a fixed-bed tube reactor or shell-and-tube reactor or in a plate heat exchanger reactor. Cascading of fluidized-bed reactors is also conceivable.

The heat involved in the reaction can be removed via the reactor walls. In addition, the formation of hotspots can be reduced by structuring of a fixed bed of the catalyst using inert materials.

If hydrogen is used in a substoichiometric amount in the process of the invention, the reaction with hydrogen can serve to achieve a sufficiently high temperature for the necessary reaction between hydrocarbons and oxygen. In this way, formation of carbon deposits can be largely avoided.

If no hydrogen is used or a substoichiometric amount of hydrogen is used, the oxygen reacts predominantly with the most reactive molecule, for example butadiene. This results in formation of carbon oxides and water. Since the reaction of oxygen with the hydrocarbons proceeds more slowly than that with hydrogen at low temperature, the hydrogen is firstly consumed completely.

The invention is illustrated by the following examples.

EXAMPLES

Example 1

Production of the Catalyst

The catalyst comprises 99.7% by weight of zeolite A, molecular sieve 3A (from Roth-GmbH), 0.3 mm type 562 C, bead shape, spheres having a diameter in the range from 2.5 to 5 mm, and also 0.3% by weight of platinum.

1000 g of molecular sieve and 5.2 g of platinum nitrate are used for producing the catalyst. Platinum nitrate is dissolved in water and the solution is made up to a total of 460 ml of solution. The support is then impregnated to 100% of its water uptake. For this purpose, the molecular sieve is divided between two porcelain dishes, the impregnation solution is added and the mixture is mixed well.

This was followed by drying for 16 hours at 120° C. in a convection drying oven and calcination for four hours at 400° C. in a muffle furnace.

To carry out the silylation, the catalyst obtained in this way was placed in a glass beaker and a solution of Ludox and water in a ratio of 1:10 (final concentration 4% by weight) was produced. The amount was calculated so that the catalyst could be well covered in the glass beaker. The mixture was stirred at regular intervals and after 40 minutes was filtered through a fluted filter. This was once again followed by drying for 16 hours at 120° C. in a convection drying oven and subsequent calcination for 4 hours at 400° C. in a muffle furnace.

Elemental analysis indicated a Pt content in the catalyst of 0.27% by weight.

Example 2

Oxygen Removal

An oxygen removal reactor of a miniplant was used. The flow-through reactor had a length of 200 cm, an external diameter of 25 cm, a wall thickness of 2 cm and an internal diameter of 21 cm. It was constructed of steel.

The reactor was equipped with three external heating zones which were equipped with copper blocks for improved heat transfer from the heating elements to the reactor wall. In order to obtain an adiabatic system, the copper blocks were removed and replaced by insulation material in the second and third heating zones. The first heating zone was used as a preheating zone in order to set the inlet gas temperature in the reactor. The second and third heating zones were set so that heat losses were avoided as far as possible. The tube reactor was filled with catalyst only beyond the end of the first heating zone. A pneumatically operated, multiple temperature sensor having four measurement points was used for determining the temperature profiles with a resolution of 2 cm in the catalyst bed. The catalyst bed was packed between beds of an inert material (steatite) which served as guard bed. Both isothermal and adiabatic modes of operation were examined.

An alternative reactor on a laboratory scale had a length of 70 cm, an external diameter of 25 cm, a wall thickness of 2 cm and an internal diameter of 21 cm. It was constructed of steel.

Typical reaction conditions were a catalyst volume of 0.1 l, a catalyst quantity of from 0.01 to 0.1 kg, a GHSV of from 2000 to 10 000 standard $l_{gas}l_{cat}^{-1}$ $h^{-1}$, an inlet temperature of from 150 to 410° C. and an outlet pressure of from 1.5 to 2.5 bara.

A typical inlet gas stream comprised from 15 to 20% by volume of $C_4$-hydrocarbons (70% by volume of butadiene and 30% by volume of butane), from 10 to 20% by volume of water, from 5 to 10% by volume of hydrogen, from 50 to 60% by volume of nitrogen and from 3 to 5% by volume of oxygen.

In a mode of operation without hydrogen, the proportion of hydrogen was replaced by inert gas.

The aim of the process is to reduce the oxygen content to values of less than 100 ppm at the reactor outlet. For processes without addition of hydrogen, the yields are based on $CO_2$ and traces of CO. In the process with introduction of hydrogen, the yields are based on $CO_2$ and CO and on dehydrogenation products of butadiene (butene isomers).

At a temperature of 410° C., a pressure of 0.5 bar/g and a GHSV of about 3000 $h^{-1}$, residual oxygen contents of 97 ppm were found for the catalyst from example 1 without addition of hydrogen and 75 ppm were found when hydrogen was concomitantly used. The yield without addition of hydrogen was 4.0%, and that with addition of hydrogen was 3.6%.

When, as an alternative, a catalyst comprising 28% by weight of copper on aluminum oxide was used, 108 ppm of residual oxygen were found without addition of hydrogen and 100 ppm of residual oxygen were found with addition of hydrogen.

The catalyst of the invention met the requirements and at the same time displayed only very low formation of by-products.

Example 3

The miniplant from example 2 was used and the procedure of example 2 was repeated except where indicated otherwise below.

|  |  | Isothermal | Adiabatic |
|---|---|---|---|
| Amount of gas |  | 377 standard l/h of $N_2$; 150 standard l/h of $C_4$; 62 standard l/h of $H_2$; 122 standard l/h of air; 96 g/h of $H_2O$ | 377 standard l/h of $N_2$; 150 standard l/h of $C_4$; 62 standard l/h of $H_2$; 122 standard l/h of air; 96 g/h of $H_2O$ |
| Residual O2 | ppm | 80 | 50 |
| C4 loss | % | 3.2 | 1.8 |
| Pressure | bar gauge | 0.5 | 0.5 |
| Support heating zone | ° C. | 200/200/200 | 375/530/530 |
| Material | cm | ° C. | ° C. |
| Inert | 0 | 190 | 305 |
| Inert | 2 | 194 | 305 |
| Inert | 4 | 203 | 306 |
| Inert | 6 | 222 | 307 |
| Inert | 8 | 242 | 309 |
| Inert | 10 | 260 | 311 |
| Catalyst | 12 | 277 | 312 |
| Catalyst | 14 | 327 | 330 |
| Catalyst | 16 | 405 | 384 |
| Catalyst | 18 | 466 | 443 |
| Catalyst | 20 | 477 | 482 |
| Catalyst | 22 | 479 | 503 |
| Catalyst | 24 | 464 | 519 |
| Catalyst | 26 | 449 | 527 |
| Catalyst | 28 | 429 | 533 |
| Catalyst | 30 | 411 | 535 |
| Catalyst | 32 | 399 | 535 |
| Catalyst | 34 | 390 | 534 |
| Catalyst | 36 | 379 | 533 |
| Catalyst | 38 | 365 | 532 |
| Inert | 40 | 352 | 531 |
| Inert | 42 | 335 | 530 |
| Inert | 44 | 323 | 524 |
| Inert | 46 | 321 | 523 |
| Inert | 48 | 318 | 522 |
| Inert | 50 | 317 | 520 |
| Inert | 52 | 313 | 519 |

The invention claimed is:

1. A catalyst comprising from 0.01 to 0.5% by weight of platinum, based on the catalyst, and optionally tin, with the weight ratio of Sn:Pt being from 0 to 10, on zeolite A as support.

2. The catalyst according to claim 1, wherein the weight ratio of Sn:Pt is from 0.5 to 10.

3. The catalyst according to claim 1, wherein the platinum content is from 0.05 to 0.4% by weight.

4. The catalyst according to claim 1, wherein the BET surface area of the catalyst is from 10 to 80 $m^2/g$.

5. The catalyst according to claim 1 wherein the catalyst is a shaped body having an average diameter in the range from 1 to 10 mm.

6. The catalyst according to claim 1, wherein the catalyst is a monolith.

7. The catalyst according to claim 6, wherein the monolith comprises a washcoat on a support structure.

8. A process for producing a catalyst according to claim 1 by impregnation of the support with a solution of a platinum compound and optionally a tin compound and subsequent drying and calcination.

9. A process for removing oxygen from a hydrocarbon stream comprising free oxygen by catalytic combustion, wherein the hydrocarbon stream comprising free oxygen is reacted over the catalyst according to claim 1 to give an oxygen-depleted hydrocarbon stream.

10. The process according to claim 9, wherein the hydrocarbon stream comprising free oxygen comprises from 3 to 8% of free oxygen.

11. The process according to claim 9, wherein the hydrocarbon stream comprising free oxygen comprises an amount of free hydrogen sufficient for reaction with the free oxygen and/or hydrogen is added thereto and the free oxygen is reacted with the free hydrogen.

12. The process according to claim 9, wherein the hydrocarbon stream comprising free oxygen does not comprise any free hydrogen and no free hydrogen is added thereto.

13. The process according to claim 12, wherein the free oxygen is reacted with hydrocarbon comprised in the hydrocarbon stream comprising free oxygen or with added methanol, natural gas and/or synthesis gas as reducing agent.

14. The process according to claim 9, wherein at least 80% by volume of the hydrocarbons in the hydrocarbon stream are $C_3$- and/or $C_4$-hydrocarbons.

* * * * *